United States Patent [19]

Mallett

[11] Patent Number: 5,639,997
[45] Date of Patent: Jun. 17, 1997

[54] ACOUSTIC NOISE CANCELLING APPARATUS FOR WELL LOGGING AND METHOD OF WELL LOGGING

[75] Inventor: A. J. Mallett, Houston, Tex.

[73] Assignee: Halliburton Company, Houston, Tex.

[21] Appl. No.: 702,169

[22] Filed: Aug. 23, 1996

Related U.S. Application Data

[63] Continuation of Ser. No. 424,908, Apr. 19, 1995, abandoned.

[51] Int. Cl.$^6$ ............................................. G01V 1/40
[52] U.S. Cl. ..................... 181/102; 181/108; 181/112; 367/38; 73/152.47; 73/152.16; 175/40; 175/50
[58] Field of Search ............................. 181/112, 108, 181/102; 367/38; 73/152.47, 152.16; 175/40, 50

[56] References Cited

U.S. PATENT DOCUMENTS

| | | | |
|---|---|---|---|
| 3,191,143 | 6/1965 | Pardue | 340/17 |
| 3,381,267 | 4/1968 | Cubberly, Jr. et al. | 340/17 |
| 3,493,921 | 2/1970 | Johns | 340/17 |
| 4,808,996 | 2/1989 | Zimmer | 340/858 |
| 5,036,945 | 8/1991 | Hoyle et al. | 181/104 |
| 5,229,553 | 7/1993 | Lester et al. | 181/102 |
| 5,343,001 | 8/1994 | Cowles et al. | 181/102 |
| 5,467,320 | 11/1995 | Maki, Jr. | 367/40 |

FOREIGN PATENT DOCUMENTS

| | | |
|---|---|---|
| 0 375 549 A2 | 12/1989 | European Pat. Off. . |
| 2257785 A | 1/1993 | United Kingdom ............ G01V 1/40 |

OTHER PUBLICATIONS

*Incompressible Flow*, Chapter 11 "Flows that are Exact Solutions of the Navier—Stokes Equations", Ronald L. Panton, Wiley–Interscience Publication (pp. 262–302).

Search Report for corresponding UK application.

*Primary Examiner*—J. Woodrow Eldred
*Attorney, Agent, or Firm*—Gilbreth & Strozier, P.C.; J. M. (Mark) Gilbreth; Robert W. Strozier

[57] ABSTRACT

Disclosed is a sonic well tool for performing acoustic investigations of subsurface geological formations penetrated by a borehole, and a method of logging formation data. The well tool generally includes a longitudinally extending body for positioning in said borehole. The tool also includes a transmitter supported by the body for transmitting acoustic energy, and at least two receivers. One of the receivers is positioned on the interior of the sonic tool to receive the acoustic signals that traverse the sonic well tool. The second receiver is positioned on the exterior of the sonic tool and receive sonic signals that traverse the sonic tool and those that traverse the formation. The apparatus further includes a processor for subtracting the well tool signal of the first receiver from the combined well tool and formation signal of the second receiver.

12 Claims, 4 Drawing Sheets

ACOUSTIC NOISE CANCELLING APPARATUS FOR WELL LOGGING AND METHOD OF WELL LOGGING

This is a continuation of application Ser. No. 08/424,908 filed on Apr. 19, 1995 abandoned.

BACKGROUND OF THE INVENTION

1. Field of the Invention

The present invention relates to an apparatus for well logging to a method of logging a well. In another aspect, the present invention relates to acoustic well tool apparatus, and to a method of performing acoustic investigations in a well. In still yet another aspect, the present invention relates to acoustic well tool apparatus in which the sonic waves travelling along the well tool are cancelled from the recorded well log acoustic signal.

2. Description of the Related Art

Hydrocarbon exploration and data gathering continues even after the drilling of a well, generally by utilizing wireline logs that are obtained to reveal certain physical characteristics of the formation. The formation porosity and water saturation may be derived by measuring formation resistivity, neutron and gamma ray values.

Formation porosity may also be obtained by taking sonic logs utilizing a sonic well logging tool. Sonic logs are also taken to obtain the speed of propagation of sound in the rock, and to obtain information on the bulk elastic properties of the formation.

Such information that may be obtained from sonic logs is useful in a variety of applications, including well to well correlation, determining porosity, determining the mechanical or elastic parameters of the rock and hence an indication of lithology, detecting overpressured formation zones, and enabling the conversion of a seismic time trace to a depth trace from information acquired on the speed of sound in the formations.

In addition to being able to obtain resistivity, neutron and gamma ray investigations using wireline tools, oilfield technology developed in the late 1980's produced alternatives to wireline logs, mainly, the resistivity, the neutron and the gamma ray density measurements can now be performed on the drill string while drilling, i.e. "measuring while drilling" or "MWD".

However, similar developments of a "while drilling" alternative to the fourth most commonly used log, the sonic tool transmitter travel to the sonic tool receiver via the formation, it is also possible for such signals to travel from the transmitter to the receiver via the tool body itself. It is desirable that the detected signal be virtually free of energy launched by the transmitter into the tool body which is then propagated along the tool body to the position of the receiver.

The velocity of sound through liquids of the type typically found in a well bore is on the order of 5,000 feet per second. On the other hand, the velocity of sound through earth formations is in the range of about 5,000 to about 25,000 feet per second. By way of comparison, metals can have sonic propagation velocities ranging between 13,000 and 20,000 feet per second.

Since the speed of propagation of sound in the tool body, which is normally steel, can in some instances be much high than that of the formation rock, the tool signal arrival in those cases invariably occur before the formation arrival. As a sonic tool merely records signals as they are obtained, the tool has no way of distinguishing whether a signal has traversed the formation or the tool body. Thus, such a first arriving signal traversing the tool body may be confused as the sonic log, has not been as successful as with the "while drilling" alternative for taking resistivity, neutron and the gamma ray density logs.

With a sonic log, an acoustic signal is generated at a transmitting transducer, which signal propagates through the formation to at least one receiving transducer and the time of first signal arrival is detected. As the time of transmission is known, and the time of the first arrival of acoustic energy at the receiver after having passed through the formation is measured, the time of propagation of the signal through the formation which is referred to as interval transit time $\Delta t$ can now be calculated. This interval transit time may then be used in the Wyllie time-average equation, $\Delta t = \Delta t_{solid}(1-\phi) = \Delta t_{fluid}(\phi)$, to obtain porosity $\phi$. $\Delta t_{solid}$ and $\Delta t_{fluid}$ are known from predetermined knowledge of the speed of propagation of sound in various rocks and fluids and by knowing the types of rock and fluid in which the investigation is being made. As an alternative to the Wyllie time average relationship, the more recent "Raymer, Hunt, Gardner" relationship may also be utilized.

While it is desired that signals generated by the first arriving signal traversing the formation.

Fortunately, various techniques have been developed in the wireline logging industry for attenuating and/or slowing down the tool propagated signal so that formation arrival may be detected without much interference from the tool propagated signal. In such wireline investigations, the tool is not required to function as a load bearing member so that it has been possible to form an array of staggered openings through the width of the sidewall of the tool's housing. These openings serve to lengthen the total path length that a housing propagated acoustic signal must follow so that the signal across an extremely broad range of frequencies is not only delayed in its transit of the array of holes, but is also attenuated as a result of the increased path length and the signal scattering caused by the openings.

U.S. Pat. No. 3,381,267, issued Apr. 30, 1968 to Cubberly, Jr. et al. discloses a well logging tool having a rigid housing with a large number of reversed paths and interface surfaces to provide an extremely tortuous path for attenuation of sonic energy that would otherwise travel longitudinally along the housing between the transmitter and receiver.

U.S. Pat. No. 3,493,921, issued Feb. 3, 1970, to Johns discloses a sonic well logging tool which utilizes between the transmitter and receiver, a configuration of collapsed bellows, which configuration is stated as achieving desired characteristics as to structural integrity, sonic delay and sonic attenuation.

U.S. Pat. No. 4,850,450, issued Jul. 25, 1989 to Hoyle et al., discloses an acoustic logging tool having a plurality of holes in the tool housing wall to delay the acoustic energy passing from the transmitter to the receiver along the housing, so that the first acoustic arrival will be based on characteristics of the borehole formation rather than the tool housing.

U.S. Pat. No. 5,036,945, issued Aug. 6, 1991, to Hoyle et al. discloses a sonic well tool having a first and second attenuation and delay apparatus for attenuating and delaying the signal traversing the tool body. The first attenuation and delay apparatus includes interleaved rubber and metal like washers for attenuating compressional and flexural waves propagating along the body, and further includes a bellows section having a corrugated shape and a thin traverse dimension. The second attenuation and delay apparatus includes mass loading rings surrounding the housing of the well tool, and also includes a bellows section having a corrugated shape and a thin traverse dimension.

U.S. Pat. No. 5,229,553, issued Jul. 20, 1993 to Lester et al. discloses an acoustic isolator for use with a well logging tool having transducers in a first and third tool segment, which are to be acoustically isolated from receivers in a second and fourth tool segment. The acoustic isolator consists of vertebrate links composed of spools, encased by resilient boots, which spools are arranged end-to-end in tandem configuration. A plurality of split shells interconnect the spools by externally gripping the boots covering the end portions of the respective adjacent spools.

The expedient of providing openings or cuts that extend through the side wall thickness of the sonic well tool is clearly unsatisfactory for a sonic investigation performed from a drilling string or drill collar. In the measuring while drilling ("MWD") environment, the sonic tool is incorporated into the drill collar and must be able to withstand the immense forces and accelerations encountered during the drilling of the well. Large numbers of perforations through the side wall of the drill collar would weaken the collar so that it would no longer be able to withstand normal wear and tear of drilling. Additionally, the fluid isolation between the inside of the drill collar and its exterior would be lost.

Openings or cuts extending through only a fraction of the width of the drill collar have not been thought to be effective since the remaining portion of the drill collar has previously been thought to provide a "straight through" path for the unattenuated propagation of the acoustic signal.

Additionally, the prior art expedient of "convoluting" the sidewall of the sonic tool so that the tool have a uniformly thick, yet tortuous longitudinal cross-section is equally unsatisfactory in that such shapes either are too weak or require too large a portion of the limited diameter of the tool.

E.P. No. 0 375 549, published Jun. 27, 1990 discloses a method and apparatus for performing acoustic investigations in a borehole. The sonic tool includes a plurality of axially periodic, substantially circumferentially continuous sections of the drill collar (such as grooves or ridges in the form of circumferential rings or helical threads) with acoustic propagation characteristics different from the drill collar to attenuate and delay signals traversing the sonic tool. Also discloses "portions" formed in the surface of the drill collar at random locations, which may be filled with epoxy, fiberglass or some other material having significant resistance to the abrasion expected through contact with the borehole wall during the drilling process.

While these prior art inventions attempt to address the problem of sound waves traversing the sonic tool, they each suffer from one or more limitations. Therefore, a need exists in the art for an improved sonic well logging tool.

A need exists in the art for an improved method of sonic well logging.

A need also exists in the art for an improved well logging tool in which sonic signals traversing the body of the sonic well tool do not cause undue interference with the desired sonic signals traversing the formation.

A need also exists in the art for a method of sonic well logging in which sonic signals traversing the body are characterized and then removed from the received signal so that they do not cause undue interference with the desired sonic signals traversing the formation.

These and other needs in the art will become evident to those of skill in the art upon review of this application.

SUMMARY OF THE INVENTION

It is one object of the present invention to provide an apparatus for sonic well logging.

It is another object of the present invention to provide a method for sonic well logging.

It is another object of the present invention to provide an apparatus for sonic well logging in which sonic signals traversing the body of the sonic well tool do not cause undue interference with the desired sonic signals traversing the formation.

It is another object of the present invention to provide a method of sonic well logging in which sonic signals traversing the body are characterized and removed from the received signal so that they do not cause undue interference with the desired sonic signals traversing the formation.

These and other objects will become evident to those of skill in the art upon review of this application.

According to one embodiment of the present invention there is provided an apparatus for sonic well logging having at least one transmitter and at least two receivers. One of the receivers is positioned on the interior of the sonic tool to receive the acoustic signals that traverse the sonic well tool. The second receiver is positioned on the exterior of the sonic tool and receive sonic signals that traverse the sonic tool and those that traverse the formation. The apparatus further includes a processor for subtracting the well tool signal of the first receiver from the combined well tool and formation signal of the second receiver.

According to another embodiment of the present invention there is provided a method for attenuating sonic waves travelling along a sonic well tool having a longitudinally extending body and two receivers. The method includes transmitting acoustic energy from the transmitter into the body and into the formation. The method also includes receiving with the first receiver, energy from the transmitter which has traversed the body, and energy from the transmitter which has traversed the formation, and receiving with the second receiver, energy from the transmitter which has tranversed the body. Finally, the method includes creating a signal representative of the formation by subracting energy received by the second receiver from energy received from the first energy.

DETAILED DESCRIPTION OF THE INVENTION

Figure 1:
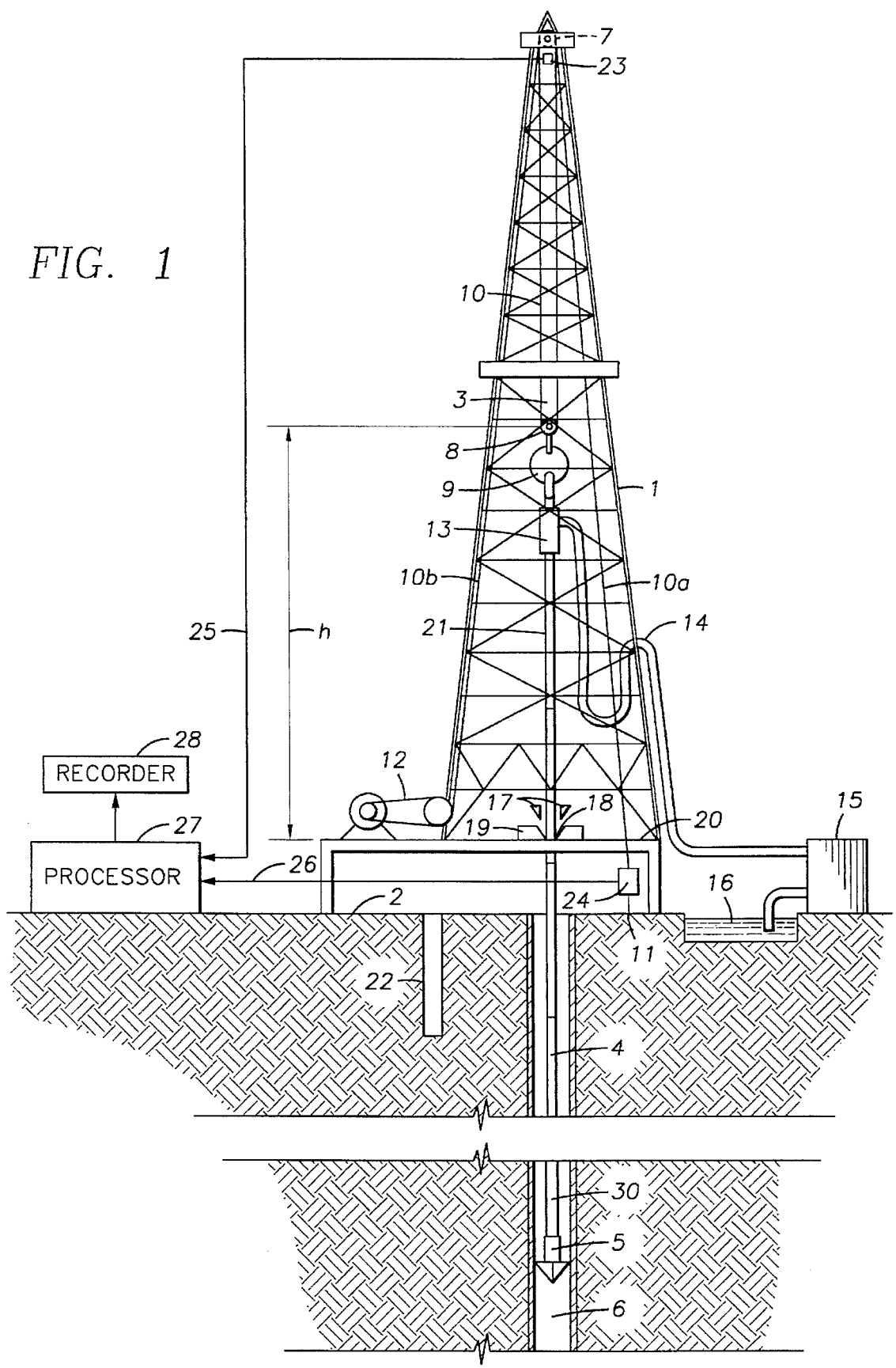
FIG. 1 is a schematic illustration of a drilling rig and the drill string with the downhole acoustic logging tool of the present invention.

Drilling rigs, drill strings and acoustic tools are in general well known. FIG. 1, and the following discussion of FIG. 1 regarding the general relationship between the drilling rig, drill string and acoustic tool, as shown in FIG. 1, are both based on EP 0 375 549 A2. Of course, while the use of an acoustic well tool is well known, the particular well tool 30 of the present invention is believed to be patentably distinct from any of the prior art tools.

Referring now to FIG. 1 there is shown a general illustration of a drilling rig and the drill string with the downhole acoustic logging tool of the present invention. The rotary drilling rig shown generally includes mast 1 rising above ground 2 which is fitted with lifting gear 3 from which is suspended a drill string 4 formed of drill pipes screwed one to another and having at its lower end a drill bit 5 for the purpose of drilling a well 6. The lifting gear 3 consists of a crown block 7, the axis of which is fixed to the top of the mast 1, a vertically travelling block 8, to which is attached a hook 9, a cable 10 passing round blocks 7 and 8 and forming, from crown block 7, on one hand a dead line 10a anchored to a fixed point 11 and on the other an active line 10b which winds around the drum of winch 12.

Drill string 4 is suspended from hook 9 by means of a swivel 13 linked by hose 14 to a mud pump 15, which permits the injection of drilling mud into well 6, via the hollow pipes of the drill string 4. Drilling mud may be drawn from a mud pit 16 which may be fed with surplus mud from the well 6. The drill string may be elevated by turning the lifting gear 3 with winch 12 and the drill pipes may be successively removed from (or added to) the well 6 and unscrewed in order to remove bit 5. These drill pipe raising and lowering operations require the drill string 4 to be temporarily unhooked from the lifting gear 3; the former is then supported by blocking it with wedges 17 in a conical recess 18 in the rotating table 19 mounted on platform 20 through which the drill string passes. The lowermost portion of the drill string may contain one or more tools 30, including the aparatus of the present invention for investigating downhole drilling conditions or for investigating the properties of the geological formation.

During drilling operations, the drill string 4 is driven in a rotary motion by means of a kelly 21 fitted to its upper end. Between such periods the kelly is stored in a pipe sleeve 22 in the ground.

Variations in the height h of the travelling block 8 during these drill string 4 raising operations are measured by means of sensor 23 which may be an angle of rotation sensor coupled to the faster pulley of crown block 7. The weight F applied to hook 9 of the travelling block 8 may also be measured by means of a strain gauge 24 inserted into dead line 10a of cable 10 to measure its tension. Sensors 23 and 24 are connected by lines 25 and 26 to a processing unit 27 which processes the measurement signals and which incorporates a clock. A recorder 28 is connected to the processing unit 27, which is preferably a computer.

Figure 2:
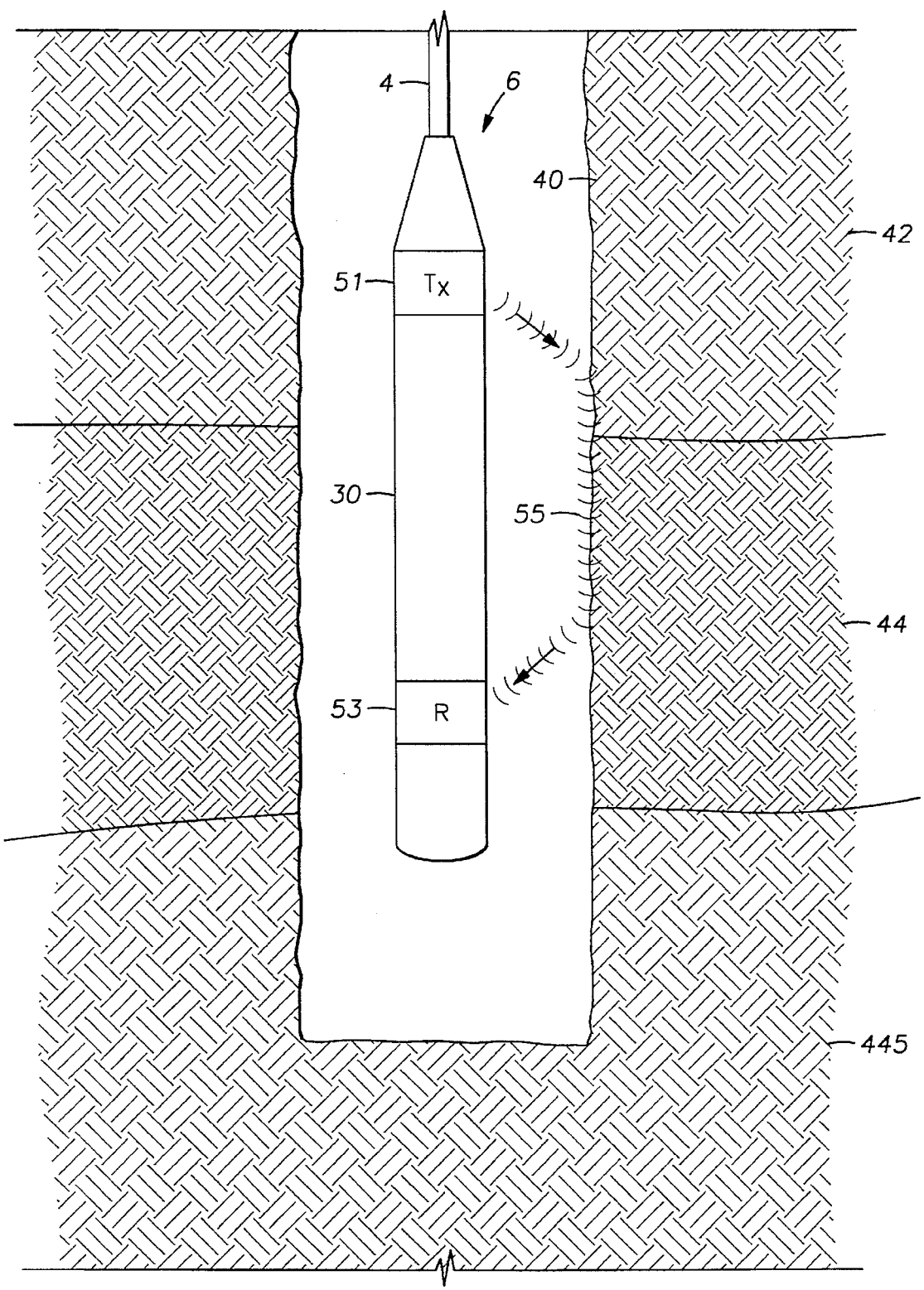
FIG. 2 shows a tool 30 having transmitter 51 and receiver 53, suspended on drilling string 4 or wireline 4 in well bore 6, within subterranean 40 having geologic layers 42, 44 and 45, and further shwons signals travelling from transmitter 51 to external receivers 53 along travel path 55.

Referring now to FIG. 2 there is shown a tool 30 suspended on drilling string 4 or wireline 4 in well bore 6. Tool 30 further includes transmitter 51 and receiver 53. Subterranean 40 includes geologic layers 42, 44 and 45. Tool 30 is used to discern information about the subterranean by signals travelling from transmitter 51 to receiver 53 along travel path 55. As explained above, signals from transmitter 51 will also tend to travel to receiver 53 via tool 30 itself.

Figure 3:
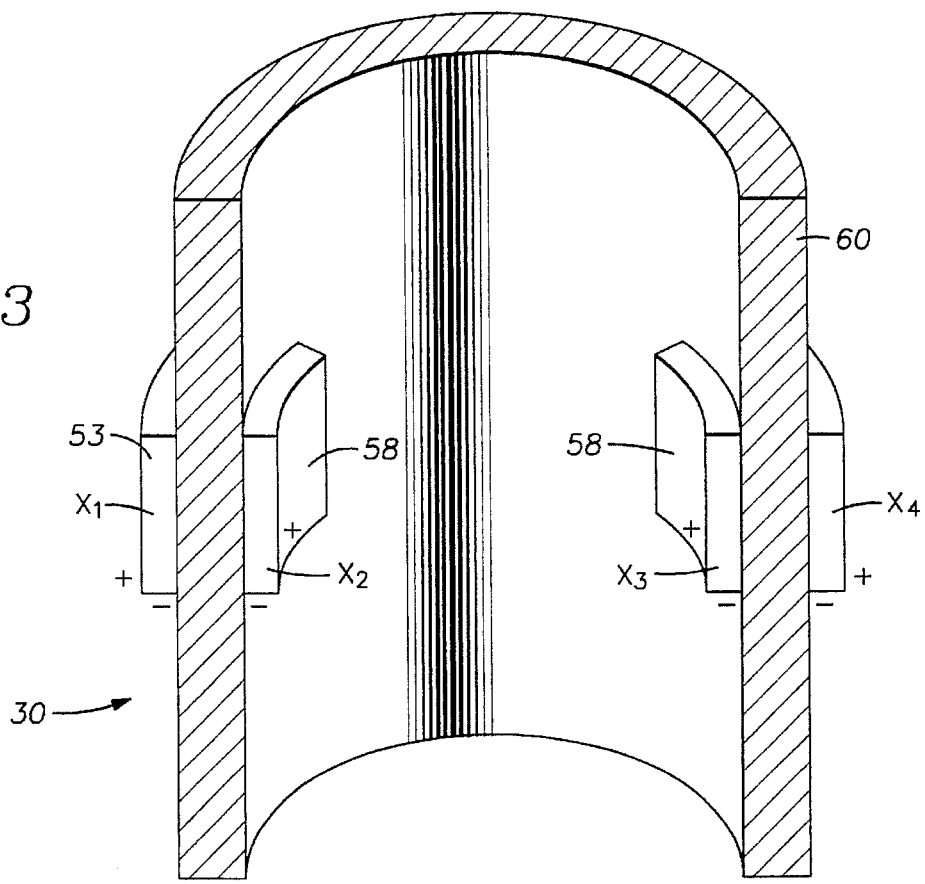
FIG. 3 is a cross-sectional view of the tool body of the apparatus 30 of the present invention, showing tool body 60, showing exterior receivers 53 positioned on the exterior of tool body 60 to receive signals from the transmitter that traverse either tool body 60, or that traverse the formation, and showing internal receivers 58 positioned on the interior of tool body 60 to receive only those signals from the transmitter that traverse tool body 60.

Referring now to FIG. 3 there is shown a cross-sectional view of the tool body of the apparatus of the present invention, showing tool body 60, internal receivers 58 and external receivers 53.

Receivers 53, comprising receivers $X_1$ and $X_4$ are positioned on the exterior of tool body 60 to receive signals from the transmitter that traverse either tool body 60, and those that traverse the formation.

Receivers 58, comprising receivers $X_2$ and $X_3$, are positioned on the interior of tool body 60 to receive only those signals from the transmitter that traverse tool body 60. Receivers 58 are generally isolated from substantially all of the acoustic energy from the transmitter that has traversed the formation.

Figure 5:
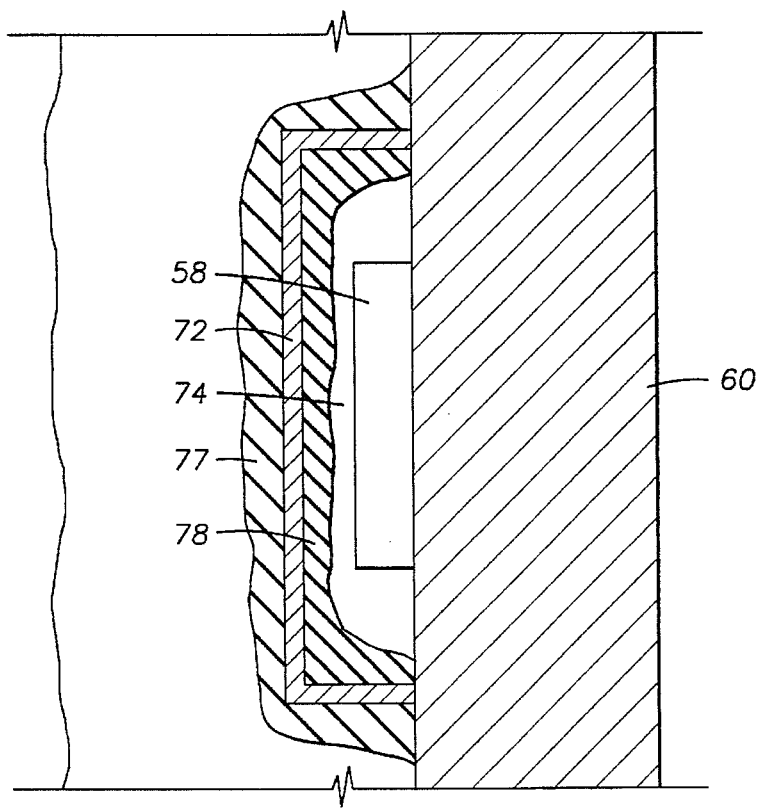
FIG. 5 is a cross-section showing tool body 60 and receiver 58, and illustrating one means for isolating receivers 58 by encasement receivers 58 in a isolation housing 72 having dampening materials 77 and 78.

For examples, if receivers 58 are exposed to the borehole fluid receivers 58 will respond to formation born signals, for example, such as with a logging tool constructed so as to allow free flow of borehole fluid both outside and inside the receiver sonde. In such a senario, the formation signals are transmitted from the wall of the borehole to the receivers as minute changes of pressure in the borehole fluid, therefore, the tool receivers 58 must be isolated for sondes that allow free flow of borehole fluid. Referring now to FIG. 5, which is a cross-section showing tool body 60 and receiver 58, there is illustrated one means for isolating receivers 58 by encasement receivers 58 in a isolation housing 72. Housing 72 may be made of any suitable material including metals such as steel, and may include interial and/or exterior dampening materials to further isolate the receivers 58. Positioned interior of housing 72 is internal dampening material 78 which lines the interial of housing 72. Positioned external of housing 72 is external dampening material 77 which coats housing 72. Dampening materials and well known, and any suitable dampening materials may be utilized as dampening materials 77 and 78. Examples of suitable materials include a tungsten and silicone rubber mixture. An air gap 74 may be utilized between receiver 58 and dampening material 78.

Figure 4A:
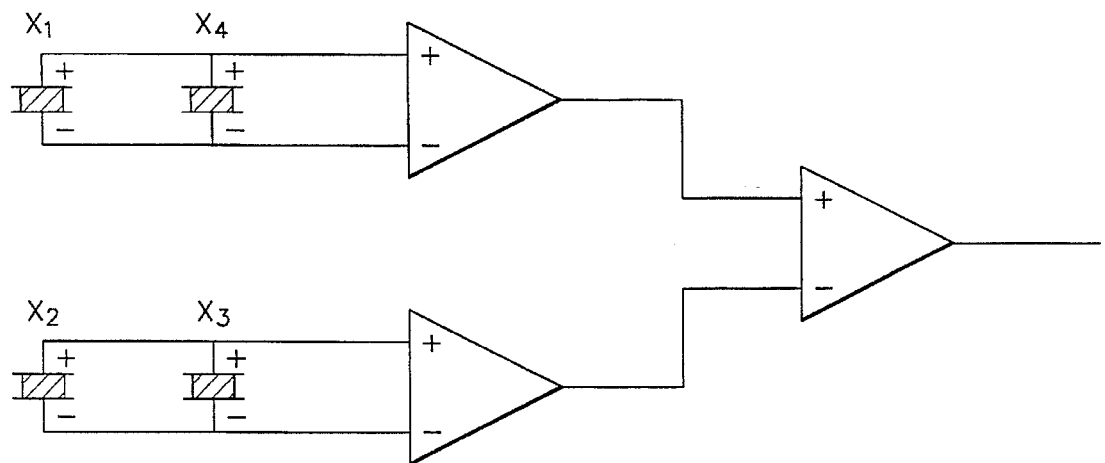
FIG. 4(a) shows a schematic representation of a logic apparaus for subtracting signal S2 from signal S1.

While receivers 53 and 58 are both illustrated as having two receiver members each, it is to be understood that receivers 53 and 58 may comprise any suitable number of receiver members, for example from 1 to 100 such receiver members. Referring now to FIG. 4(c) there is shown a signal S2 having amplitude a, which was generated by transmitter 51, which traversed the tool body 60 and which was recorded by interior receivers 58.

Figure 4B:
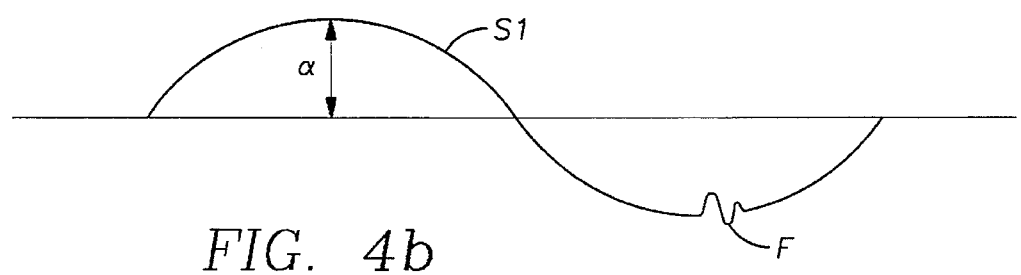
FIG. 4(b) shows a signal S1 having amplitude a, which is a sumation of a signals from transmitter 51 which traversed tool body 60, and those which traversed the formation, both of which were recorded by exterior receivers 53.
Figure 4C:
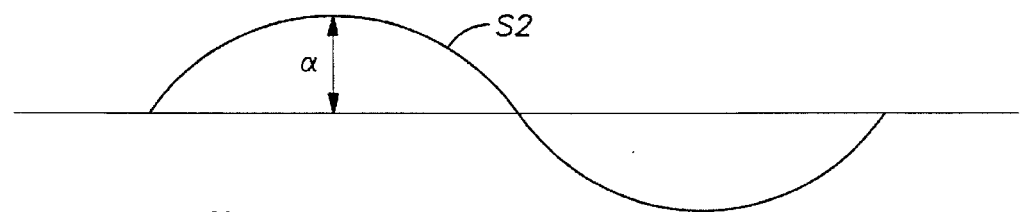
FIG. 4(c) shows a signal S2 having amplitude a, which was generated by transmitter 51, which traversed the tool body 60 and which was recorded by interior receivers 58.

Referring now to FIG. 4(b) there is shown a signal S1 having amplitude a, which is a sumation of signals from transmitter 51 which traversed tool body 60 (S2), and those which traversed the formation (F), both of which were recorded by exterior receivers 53.

The apparatus of the present invention further includes logic apparatus for subtracting signal S2 from signal S1. The logic apparatus utilized in the present invention for subtracting signal S2 from S1 may include hardware, software or combinations thereof.

If is also to be understood that the logic apparatus of the present invention may be included into processor 27, or it may be a separate unit operating on raw data from the well prior to processing by processor 27, a separate unit operating on the output of processor 27, or a separate unit operating on recorded data of recorder 28

Referring now to FIG. 4(a) there is shown a schematic representation of an example of a suitable logic apparatus for subtracting signal S2 from signal S1.

Figure 4D:
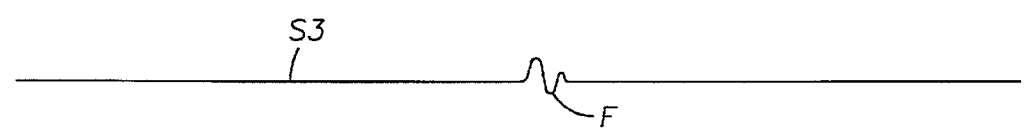
FIG. 4(d) shows the resulting formation signal obtained by subtracting signal S2 from signal S1.

FIG. 4(d) shows the resulting formation signal F signal obtained by subtracting signal S2 from signal S1.

In operation, the apparatus of the present invention is first positioned in the borehole at the proper location to analyze the desired section of the formation. Acoustic signals are then transmitted by the transmitter into both the formation and the tool body. Acoustic signals traversing the body and acoustic signals traversing the formation are received at the first receiver. Acoustic signals traversing the body are received at the second receiver. A formation signal is then created by subtracting the signals received at the second receiver from those received at the first receiver.

While the present invention has been described by reference to sonic signals, it is to be understood that the present invention has applicability to a wide range of signals, ranging from acoustic to electromagnetic. The concepts of the present invention are also applicable to other logging tools, including long space sonic tools, and shear wave tools.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

I claim:

1. An apparatus for performing acoustic investigations of a subsurface geological formation penetrated by a borehole, comprising:
   (a) a longitudinally extending body for positioning in said borehole;
   (b) a transmitter supported by the body for transmitting acoustic energy;
   (c) a first receiver supported by the body, positioned to receive both acoustic energy from the transmitter which traverses the formation and acoustic energy from the transmitter which traverse the body;
   (d) a second receiver supported by the body and positioned to receive acoustic energy from the transmitter which traversed the body, wherein the second receiver is substantially isolated from acousitic energy from the transmitter which traverses the formation.

2. The apparatus of claim 1 further including:
   (e) a processing apparatus for creating a formation signal by subtracting the acoustic energy received by the second receiver from the acoustic energy received by the first receiver.

3. The apparatus of claim 2 wherein the first receiver is mounted on the exterior of the longitudinally extending body.

4. The apparatus of claim 3 further comprising an isolation housing around the second receiver isolating the second receiver from acousitic energy from the transmitter.

5. The apparatus of claim 3 wherein the first receiver comprises two or more receivers.

6. The apparatus of claim 2 wherein the second receiver is mounted on the interior of the longitudinally extending body.

7. The apparatus of claim 6 further comprising an isolation housing around the second receiver isolating the second receiver from acousitic energy from the transmitter.

8. The apparatus of claim 5 wherein the second receiver comprises two or more receivers.

9. The apparatus of claim 1 further comprising an isolation housing around the second receiver isolating the second receiver from acousitic energy from the transmitter.

10. The apparatus of claim 1 wherein the first receiver is mounted on the exterior of the body and comprises two or more receivers, the second receiver is mounted on the interior of the body and comprises two or more receivers, and wherein the apparatus further comprises:
    (e) a processing apparatus for creating a formation signal by subtracting the acoustic energy received by the second receiver from the acoustic energy received by the first receiver.

11. The apparatus of claim 10 further comprising
    (f) an isolation housing around the second receiver which substantially isolates the second receiver from the acoustic energy from the transmitter.

12. A method for performing acoustic investigations of a subsurface geological formation penetrated by a borehole and having a longitudinal extending body positioned within the borehole, wherein the body comprises a transmitter supported by the body for transmitting acoustic energy, further comprises a first receiver and a second receiver, both supported by the body positioned to receive both acoustic energy from the transmitter, the method comprising:
    (a) transmitting acoustic energy from the transmitter into the body and into the formation;
    (b) receiving with the first receiver, energy from the transmitter which has traversed the body, and energy from the transmitter which has traversed the formation;
    (c) receiving with the second receiver, energy from the transmitter which has tranversed the body; and
    (d) creating a signal representative of the formation by subracting energy received by the second receiver from energy received from the first energy.

* * * * *